United States Patent
Yamada et al.

(10) Patent No.: US 9,010,984 B2
(45) Date of Patent: Apr. 21, 2015

(54) SPREAD ILLUMINATING APPARATUS

(75) Inventors: Taku Yamada, Kitasaku-gun (JP);
Tomoko Ohara, Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 249 days.

(21) Appl. No.: 13/610,098

(22) Filed: Sep. 11, 2012

(65) Prior Publication Data

US 2013/0070477 A1 Mar. 21, 2013

(30) Foreign Application Priority Data

Sep. 21, 2011 (JP) .................................. 2011-206268

(51) Int. Cl.
*G02B 6/42* (2006.01)
*F21V 8/00* (2006.01)

(52) U.S. Cl.
CPC ............ *G02B 6/0038* (2013.01); *G02B 6/0036* (2013.01); *G02B 6/0053* (2013.01); *G02B 6/0055* (2013.01)

(58) Field of Classification Search
CPC .. G02B 6/0035; G02B 6/0036; G02B 6/0038; G02B 6/0053; G02B 6/0055
USPC .................. 362/623–626, 613, 628
See application file for complete search history.

(56) References Cited

U.S. PATENT DOCUMENTS

| | | | | |
|---|---|---|---|---|
| 6,631,998 B2 * | 10/2003 | Egawa et al. | ................. | 362/612 |
| 7,314,303 B2 * | 1/2008 | Tsuda | ............................ | 362/626 |
| 7,374,329 B2 * | 5/2008 | Feng et al. | .................... | 362/626 |
| 8,120,726 B2 * | 2/2012 | Suzuki et al. | ................... | 349/61 |
| 8,182,131 B2 * | 5/2012 | Shim et al. | .................... | 362/625 |
| 8,425,103 B2 * | 4/2013 | Wang | ............................ | 362/613 |
| 8,646,961 B2 * | 2/2014 | Pan | ................................ | 362/612 |
| 8,764,269 B2 * | 7/2014 | Matsumoto et al. | .......... | 362/626 |

FOREIGN PATENT DOCUMENTS

| JP | A-2010-198021 | 9/2010 |
|---|---|---|
| JP | A-2010-541020 | 12/2010 |

* cited by examiner

*Primary Examiner* — Alan Cariaso
(74) *Attorney, Agent, or Firm* — Oliff PLC (57) ABSTRACT

An apparatus includes a two-sided prism sheet, and an optical path conversion unit with linear prisms. Each apex angle of the prisms increases the closer the linear prism is formed to the center in the light guide direction, and when a pair of inclined surfaces of each of the prisms has a first inclined surface and a second inclined surface, an inclination angle of the second inclined surface is larger than the one of the first inclined surface. Among the prisms, inclination angles $e_1$ and $e_2$ of a pair of inclined surfaces of a linear prism formed closest to the center and an inclination angle c of the first inclined surface and an inclination angle d of the second inclined surface of a linear prism formed closest to the side end surfaces at which the light sources are disposed satisfy a relationship $2 \times c < e_1 \le e_2 < d/2$.

4 Claims, 6 Drawing Sheets

FIG. 8 Prior Art

SPREAD ILLUMINATING APPARATUS

BACKGROUND OF THE INVENTION

1. Field of the Invention

The present invention relates to a backlight of a liquid crystal display device, and in particular to a spread illuminating apparatus that is suitable as a backlight for a liquid crystal display device used in a naked eye 3D display system.

2. Description of the Related Art

Recently, a naked eye 3D display system in which a viewer can visually recognize a stereoscopic (3D) image without using a specialized tool such as glasses has been attracting attention. Conventionally, in such a naked eye 3D display system, a technology has been proposed in which a left-eye image and a right-eye image displayed on a liquid crystal display device are respectively supplied to only the left eye and only the right eye by light distribution control of illumination light from a backlight, and thereby the naked eye 3D image is realized (for example, refer to Japanese Patent Application National Publication No. 2010-541020).

Figure 7:
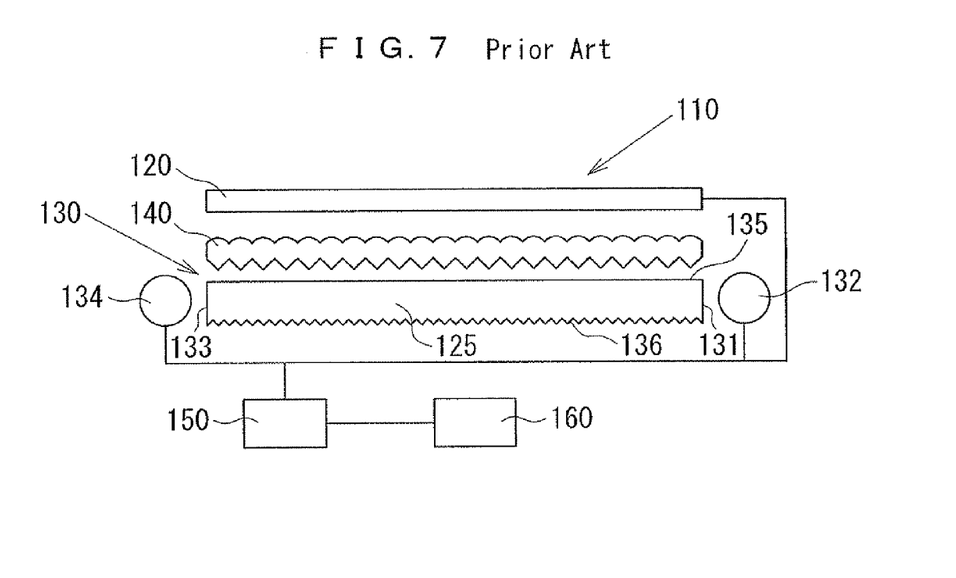
FIG. 7 is a side view illustrating an example of a conventional naked eye 3D display system.

As shown in FIG. 7, such a display device 110 includes a liquid crystal display panel 120, a backlight 130 that supplies light to the liquid crystal display panel 120, and a two-sided prism film 140 that is disposed between the liquid crystal display panel 120 and the backlight 130. The backlight 130 includes a light guide plate 125, a right-eye image solid-state light source 132 disposed on a first light input surface 131 of the light guide plate 125, and a left-eye image solid-state light source 134 disposed on a second light input surface 133. On an underside surface 136 of the light guide plate 125, a linear prism is formed across the entire surface as an optical path conversion unit.

In the two-sided prism film 140, the surface on a light output surface 135 side of the light guide plate 125 includes a three-sided prism line extending approximately in parallel to the first and second light input surfaces 131 and 133, and the surface on the display panel 120 side includes a cylindrical prism line extending approximately in parallel to the first and second light input surfaces 131 and 133. With this structure, the two-sided prism film 140 functions to convert a direction of light that has entered into the light guide plate 125 from the first light input surface 131 and exited from the light output surface 135 into a direction of the right eye of a viewer, and to convert a direction of light that has entered into the light guide plate 125 from the second light input surface 133 and exited from the light output surface 135 into a direction of the left eye of a viewer.

The display device 110 alternately displays a right-eye image and a left-eye image on the display panel 120, and selectively supplies the right-eye image to the right eye of the viewer and the left-eye image to the left eye of the viewer by illuminating the right-eye image solid-state light source 132 when displaying the right-eye image (and simultaneously turning off the left-eye image solid-state light source 134) and illuminating the left-eye image solid-state light source 134 when displaying the left-eye image (and simultaneously turning off the right-eye image solid-state light source 132). The display device 110 includes a synchronous driving element 150 and an image source 160 in order to enable the above-described operation.

In this kind of backlight 130, when illuminating the right-eye image solid-state light source 132 and when illuminating the left-eye image solid-state light source 134, the uniformity of the brightness in a light guide direction (direction from one of the first and second light input surfaces 131 and 133 to the other) is one important factor for improving the display quality of the display device 110.

Figure 8:
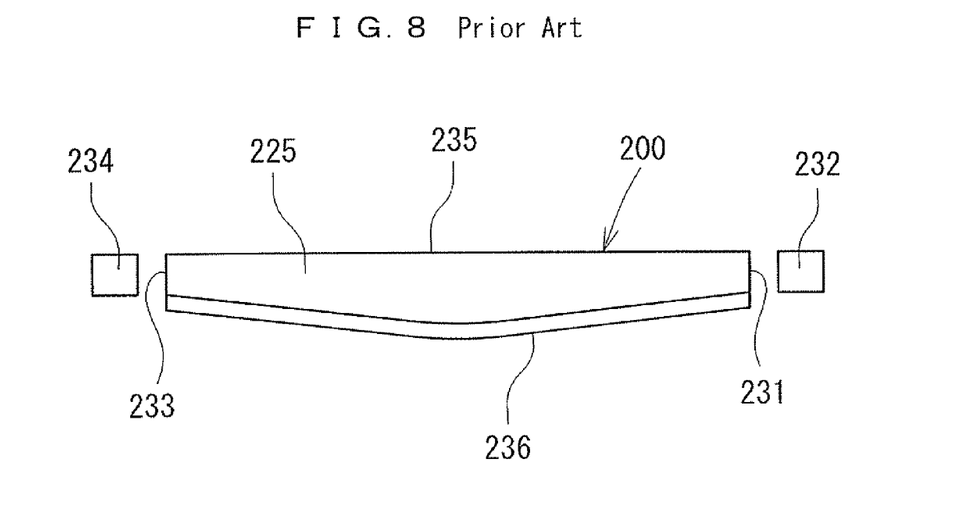
FIG. 8 is a side view illustrating an example of a light guide plate used in a backlight for a conventional naked eye 3D display system.

Conventionally, a backlight with a barrel-shaped light guide plate 225 like the backlight 200 shown in FIG. 8 has been proposed for the purpose of improving the uniformity of the brightness as described above (for example, refer to Japanese Patent Application Laid-Open No. 2010-198021). In the backlight 200, by curving an bottom surface 236 of the light guide plate 225 into a cylindrical surface shape, the light guide 225 is formed into a barrel shape in which the center portion is thicker than the peripheral portions (at incident end surfaces 231 and 233 at which light sources 232 and 234 are disposed), and a diffusing surface is formed on the bottom surface 236.

Thereby, in the backlight 200, the extraction efficiency from an emitting surface 235 of light that has entered into the light guide plate 225 from one of the light sources 232 and 234 via the corresponding incident end surface 231 or 233 is higher at the other incident end surface 233, 231 side than the incident end surface 231, 233 side through which the light entered, and thus the uniformity of brightness in the light guide direction can be improved.

SUMMARY OF THE INVENTION

However, a structure in which the light guide 225 is barrel-shaped as in the backlight 200 shown in FIG. 8 is unfavorable with regard to reducing the thickness of the backlight 200. In addition, by curving the bottom surface 236, the formation of the diffusing surface including, for example, linear prisms, requires high level processing techniques, and thus there has been a problem in that the production costs increase.

Considering the above problems, an object of the present invention is to provide a spread illuminating apparatus that is suitable as a backlight of a naked eye 3D display system, and is suitable for reduced thickness, can be produced inexpensively, and exhibits excellent uniformity of brightness.

The embodiments of the invention described below are examples of the structure of the present invention. In order to facilitate the understanding of the various structures of the present invention, the explanations below are divided into aspects. Each aspect does not limit the technical scope of the present invention, and the technical scope of the present invention can also include structures in which a portion of the components in the aspects below are substituted or deleted, or another component is added upon referring to the best modes for carrying out the invention.

According to a first aspect of the present invention, there is provided a spread illuminating apparatus including: a light guide plate that emits light which has entered from side end surfaces from an emitting surface, which is a principal surface; light sources disposed along two side end surfaces of the light guide plate, the two side end surfaces facing to each other; and a two-sided prism sheet disposed on the emitting surface side of the light guide plate, the spread illuminating apparatus further including an optical path conversion unit including a plurality of linear prisms formed repeatedly in a light guide direction on a surface on the opposite side of the emitting surface of the light guide plate, the optical path conversion unit being formed to have a symmetrical shape relative to a center in the light guide direction, wherein the plurality of linear prisms each have a triangular cross-section shape, an apex angle of each of the plurality of linear prisms increases the closer the linear prism is formed to the center in the light guide direction, when a pair of inclined surfaces of each of the plurality of linear prisms is constituted by a first inclined surface that faces one of the side end surfaces at which the light sources are disposed and a second inclined surface that faces the center in the light guide direction, an inclination angle of the second inclined surface is larger than an inclination angle of the first inclined surface, and among the plurality of linear prisms, inclination angles $e_1$ and $e_2$ of a pair of inclined surfaces of a linear prism that is formed closest to the center in the light guide direction and an inclination angle c of the first inclined surface and an inclination angle d of the second inclined surface of a linear prism that is formed closest to the side end surfaces at which the light sources are disposed satisfy a relationship $2 \times c < e_1 \leq e_2 < d/2$.

With this structure, the uniformity of the brightness in a light guide direction (in other words, a direction from one of two side end surfaces at which the light sources are disposed toward the other side end surface) can be improved in a spread illuminating apparatus including a light guide plate that emits light that has entered from side end surfaces from an emitting surface, which is a principal surface, and light sources disposed along two side end surfaces that face the light guide plate.

In the spread illuminating apparatus according to the first aspect, the light source disposed along one of the two side end surfaces of the light guide plate and the light source disposed along the other side end surface are repeatedly and alternately illuminated.

The spread illuminating apparatus of this aspect is suitable for use as a backlight of a liquid crystal panel in a naked eye 3D display system.

In the spread illuminating apparatus according to the first aspect, the light guide plate has an approximately constant thickness from one of the two side end surfaces at which the light sources are disposed to the other side end surface.

With this structure, a spread illuminating apparatus that improves the uniformity of the brightness in the light guide direction can be produced inexpensively without increasing the thickness of the light guide plate.

With the structures described above, the present invention can provide a spread illuminating apparatus that is suitable as a backlight of a naked eye 3D display system, and is suitable for reduced thickness, can be produced inexpensively, and exhibits excellent uniformity of brightness.

BRIEF DESCRIPTION OF THE DRAWINGS

FIG. 4 is a graph illustrating the brightness distribution in the light guide direction for the spread illuminating apparatus according to one embodiment of the present invention and a spread illuminating apparatus of a comparative example, each including an 8.4 inch light guide plate, wherein

FIG. 5 is a graph illustrating the brightness distribution in the light guide direction, for the spread illuminating apparatus according to one embodiment of the present invention and a spread illuminating apparatus of a comparative example, each including a 4.3 inch light guide plate, wherein

DETAILED DESCRIPTION OF THE PREFERRED EMBODIMENTS

Embodiments of the present invention will be explained below based on the attached drawings. The drawings, which show all or part of the lighting apparatus, are schematic views which highlight the characteristics of the present invention for explanation, and the relative dimensions of each illustrated part do not necessarily reflect the actual reduced scale.

Figure 1:
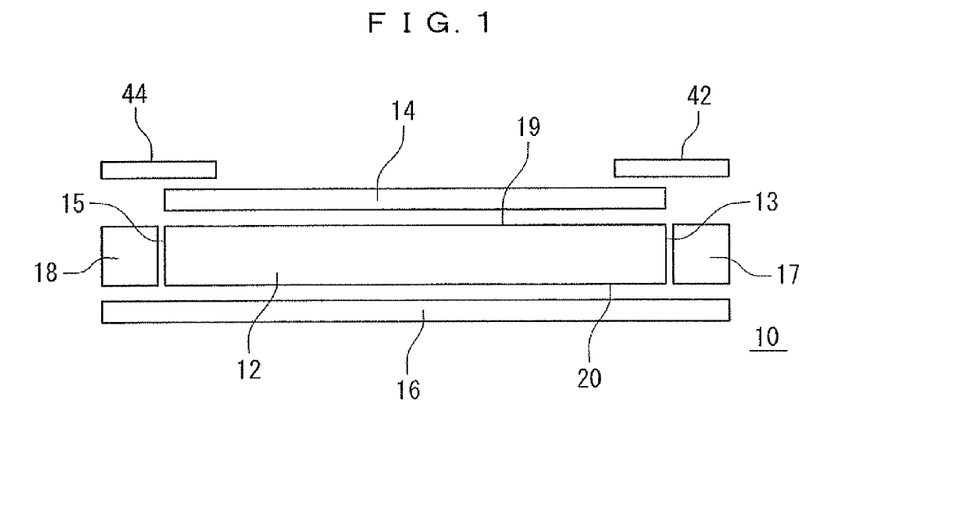
FIG. 1 is a side view illustrating the essential parts of a spread illuminating apparatus according to one embodiment of the present invention.

FIG. 1 is a side view illustrating the essential parts of a spread illuminating apparatus according to one embodiment of the present invention. A spread illuminating apparatus 10 shown in FIG. 1 is a sidelight-type spread illuminating apparatus including a light guide plate 12 and light sources 17 and 18. The light guide plate 12 is a plate-shaped light guide made by molding a transparent resin material such as a methacrylic resin or a polycarbonate resin. The light sources 17 and 18 are disposed along two side end surfaces (hereinafter also referred to as "incident light surfaces") 13 and 15 that are facing the light guide plate 12. The light sources 17 and 18 include, for example, a plurality of light-emitting diodes arranged along the lengthwise direction (the direction orthogonal to the paper surface in FIG. 1) of the incident light surfaces 13 and 15.

In the spread illuminating apparatus 10, light which has entered into the light guide plate 12 from the light sources 17 and 18 through the incident light surfaces 13 and 15 is propagated toward the respective opposing incident light surface 13 or 15 side while repeating total reflection between an emitting surface 19, which is a principal surface of the light guide plate 12, and a surface (hereinafter also referred to as an "underside surface") 20 on the opposite side of the emitting surface 19. In this process, a portion of the light that has entered the underside surface 20 is reflected by an optical path conversion unit 31 (the details regarding the structure will be explained below referring to FIG. 2) provided on the underside surface 20 and reaches the emitting surface 19 at an incident angle that is at or below a critical angle, and thereby the propagated light is uniformly extracted as emitted light from the emitting surface 19.

In the following explanation, a direction from one of the incident light surfaces 13 and 15 of the light guide plate 12 toward the other incident light surface (direction from left to right on the paper surface in FIG. 1) is referred to as the light guide direction. In the light guide 12, the incident light surfaces 13 and 15 are flat surfaces that are parallel to and facing each other, and thus in this case, the light guide direction can also be regarded as a direction orthogonal to the incident light surfaces 13 and 15. For each component of the light guide plate 12, a direction that is orthogonal to the light guide direction within a plane that is parallel to the emitting surface 19 (direction orthogonal to the paper surface in FIG. 1) is referred to as the width direction, and a direction orthogonal to the emitting surface 19 (direction from top to bottom on the paper surface in FIG. 1) is referred to as the thickness direction. The length in the light guide direction will be simply referred to as the "length", and the lengths in the width direction and the thickness direction will be respectively referred to as the "width" and "thickness".

In the spread illuminating apparatus 10, a two-sided prism sheet 14 is disposed on the emitting surface 19 side of the light guide plate 12, and an optical sheet 16 is disposed on the underside surface 20 side of the light guide plate 12. In general, the emitting surface 19 includes an effective emitting region at the center in the light guide direction and non-effective emitting regions at the outsides of the effective emitting region (the incident light surface 13 side and the incident light surface 15 side), and only light emitted from the effective emitting region is used as illumination light. In the spread illuminating apparatus 10, light blocking sheets 42 and 44, which are light absorbing members, are disposed near the incident light surfaces 13 and 15 on the emitting surface 19 side (in the example in FIG. 1, on the two-sided prism sheet) so as to cover the non-effective emitting regions.

The spread illuminating apparatus 10 can be used suitably as a backlight of a liquid crystal panel in a naked eye 3D display system as described above referring to FIG. 7. The two-sided prism sheet 14 has, for example, a structure similar to that of the two-sided prism film 140 shown in FIG. 7. However, the present invention is not limited to the structure of the two-sided prism film 140, and the two-sided prism sheet 14 can have any appropriate structure as long as it can perform the same function as that of the two-sided prism film 140.

In the spread illuminating apparatus 10, the optical sheet 16 disposed on the underside surface 20 side of the light guide plate 12 can be a reflective sheet (having a reflectance of, for example, 98% or greater), or it can be a sheet (having a reflectance of, for example, 30% or less) including a light absorbing member that prevents reflection (and by extension, incidence of the reflected light into the light guide plate 12) of light that has entered the optical sheet 16.

Figure 2:
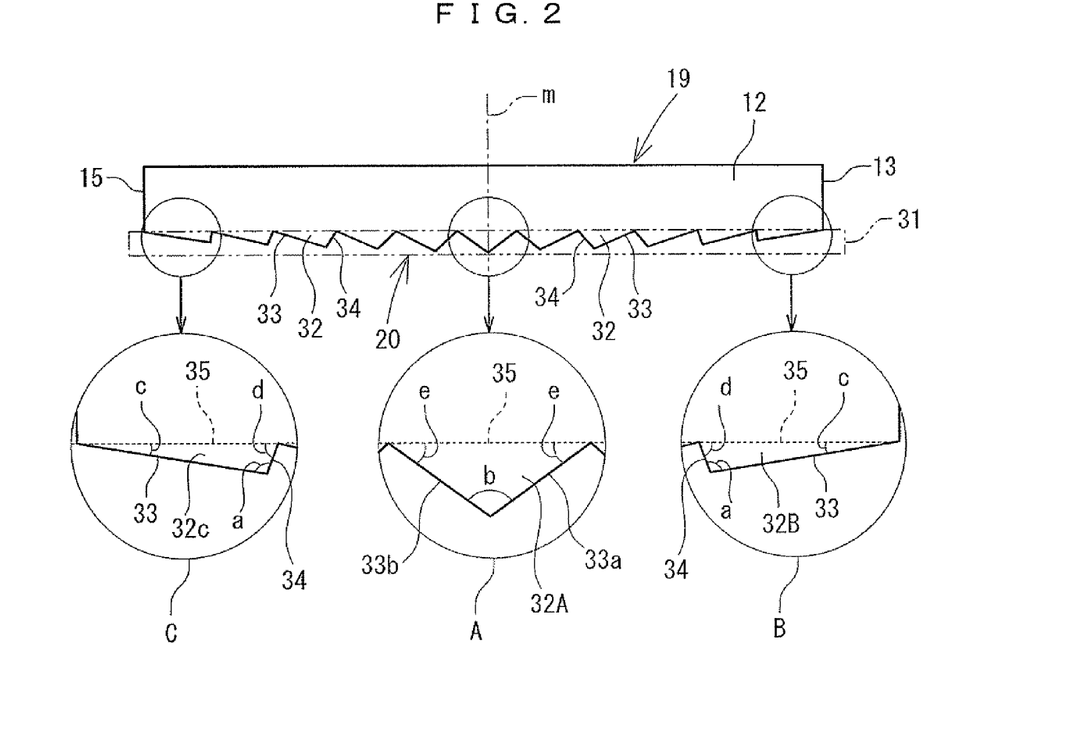
FIG. 2 is a side view illustrating a light guide plate of the spread illuminating apparatus shown in FIG. 1.

In the spread illuminating apparatus 10, an optical path conversion unit 31 including a plurality of linear prisms 32 formed repeatedly in the light guide direction as shown in FIG. 2 is provided on the underside surface 20 of the light guide plate 12. Each linear prism 32 extends in the width direction of the light guide plate 12, and the shape of a cross-section that is orthogonal to the extension direction is a triangle. The optical path conversion unit 31 is formed overall to have a symmetrical shape relative to a center m in the light guide direction.

Each linear prism 32 has a pair of inclined surfaces, and excluding a linear prism 32A formed on the center m in the light guide direction of the light guide plate 12 (enlarged view A), the inclined surfaces include a first inclined surface 33 that faces towards one of the incident light surfaces 13 and 15 and a second inclined surface 34 that faces towards the center m in the light guide direction (for example, enlarged views B and C). The pair of inclined surfaces of the linear prism 32A includes a first inclined surface 33a that faces toward the incident light surface 13 and a first inclined surface 33b that faces toward the incident light surface 15.

Below, an angle defined by the pair of inclined surfaces 33 and 34 or the pair of inclined surfaces 33a and 33b among the three inner angles of the triangle that constitutes the cross-section of each linear prism 32 will be referred to as an apex angle of the linear prism 32 (for example, angle b shown in enlarged view A and angle a shown in enlarged views B and C). Also, an angle defined by a triangular virtual base surface 35 and the pair of inclined surfaces 33 and 34 or the pair of inclined surfaces 33a and 33b will be referred to as an inclination angle of the inclined surfaces 33 and 34 or the inclined surfaces 33a and 33b (for example, angle e in enlarged view A and angles c and d in enlarged views B and C).

As described above, the optical path conversion unit 31 is formed to have a symmetrical shape relative to the center m in the light guide direction. Therefore, the cross-section shape of the linear prism 32A (enlarged view A) formed on the center m in the light guide direction is an isosceles triangle in which the apex angle b is divided into two equal parts by the center m, and the two inclination angles e of the first inclined surfaces 33a and 33b are equivalent Similarly, between two linear prisms 32 formed at symmetrical positions relative to the center m among the plurality of linear prisms 32 included in the optical path conversion unit 31 (for example, the linear prism 32B shown in enlarged view B and the linear prism 32C shown in enlarged view C), the apex angles (for example, angles a in the linear prism 32B and the linear prism 32C), the inclination angle of the first inclined surface 33 that faces toward the incident light surface 13 of one of the linear prisms 32 (for example, angle c in the linear prism 32B) and the inclination angle of the first inclined surface 33 that faces toward the incident light surface 15 of the other linear prism 32 (for example, angle c in the linear prism 32C), and the inclination angles of the second inclined surfaces 34 (for example, angles d in the linear prism 32B and the linear prism 32C) are respectively equivalent to each other.

The cross-section shape of the plurality of linear prisms 32 included in the optical path conversion unit 31 is also formed so as to satisfy the following conditions.

First, in the optical path conversion unit 31, the apex angles of the plurality of linear prisms 32 increase the closer the linear prism 32 is formed to the center m in the light guide direction.

In the example shown in FIG. 2, the linear prism 32 that is formed closest to the center m in the light guide direction is the linear prism 32A that is formed on the center m. The apex angle b of the linear prism 32A is the largest apex angle among those of the plurality of linear prisms 32. The apex angles a of the linear prisms 32B and 32C which are respectively formed closest to the incident light surface 13 and the incident light surface 15 (in other words, formed farthest from the center m in the light guide direction) are the smallest apex angles among those of the plurality of linear prisms 32. The apex angles of the plurality of linear prisms 32 increase in each linear prism 32 in the direction from the linear prism 32B toward the linear prism 32A and in the direction from the linear prism 32C toward the linear prism 32A.

Further, in the optical path conversion unit 31, in each of the plurality of linear prisms 32 excluding the linear prism 32A, the inclination angle of the second inclined surface 34 is greater than the inclination angle of the first inclined surface 33.

In addition, in the optical path conversion unit 31, the inclination angles e of the pair of inclined surfaces 33a and 33b of the linear prism 32A that is formed closest to the center m in the light guide direction are more than double the inclination angle c of the first inclined surface 33 and less than half the inclination angle d of the second inclined surface 34 of the linear prisms 32B and 32C which are formed closest to the incident light surfaces 13 and 15. In other words, the inclination angles c, e, and d satisfy the following relationship:

$$2 \times c < e < d/2 \qquad (1)$$

Figure 3:
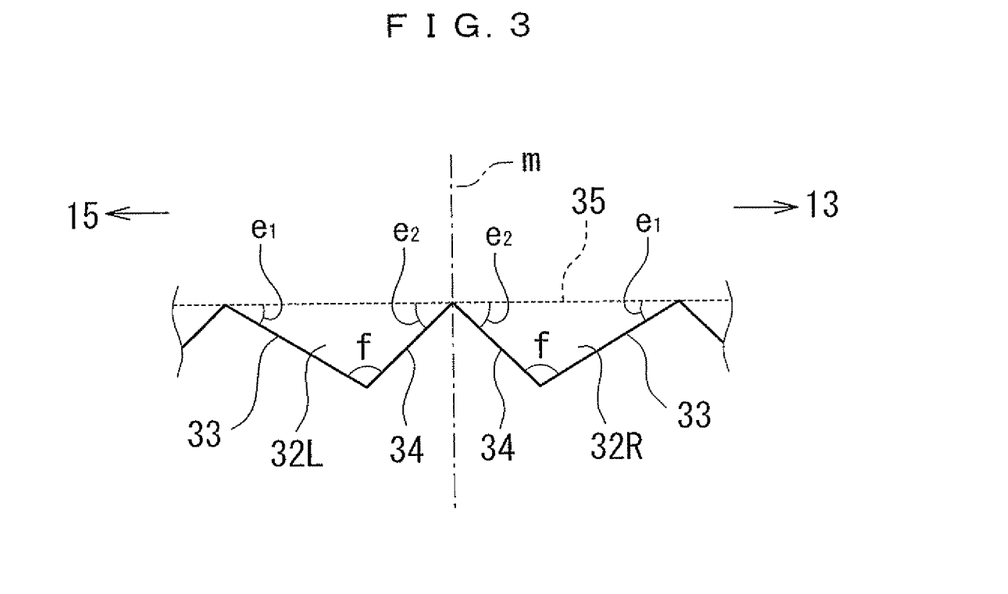
FIG. 3 is a side view illustrating an enlarged portion of another example of the light guide plate shown in FIG. 1.

In the optical path conversion unit 31 shown in FIG. 2, the linear prism 32A is formed on the center m in the light guide direction, and the linear prism 32A corresponds to a linear prism 32 that is formed closest to the center m in the light guide direction. However, in the spread illuminating apparatus 10 of the present embodiment, the optical path conversion unit 31 of the light guide plate 12 can be constituted as shown in FIG. 3, such that linear prisms 32R and 32L are formed at symmetrical positions sandwiching the center m in the light guide direction, and the linear prisms 32R and 32L both correspond to a linear prism 32 that is formed closest to the center m in the light guide direction.

In this case, similar to all of the other linear prisms 32 included in the optical path conversion unit 31, the linear prisms 32R and 32L have a pair of inclined surfaces including a first inclined surface 33 and a second inclined surface 34. The linear prisms 32R and 32L have apex angles f, inclination angles $e_1$ of the first inclined surface 33, and inclination angles $e_2$ of the second inclined surface 34 that are respectively equal to each other. The apex angles f are the largest apex angles among those of the plurality of linear prisms 32 included in the optical path conversion unit 31. In the linear prisms 32R and 32L, the inclination angle $e_2$ of the second inclined surface 34 is greater than the inclination angle $e_1$ of the first inclined surface 33.

The inclination angle $e_1$ of the first inclined surface 33 and the inclination angle $e_2$ of the second inclined surface 34 in the pair of inclined surfaces 33 and 34 of the linear prisms 32R and 32L formed closest to the center m in the light guide direction are more than double the inclination angle c of the first inclined surface 33 and less than half the inclination angle d of the second inclined surface 34 of the linear prisms 32B and 32C which are formed closest to the incident light surfaces 13 and 15. In other words, the inclination angles c, $e_1$, $e_2$, and d satisfy the following relationship:

$$2 \times c < e_1 < e_2 < d/2 \qquad (2)$$

In general, in the optical path conversion unit 31, if the inclination angles of the pair of inclined surfaces in the linear prism 32A or the linear prisms 32R and 32L, which are formed closest to the center m in the light guide direction, are set to $e_1$ and $e_2$ (with the proviso that $e_1 \leq e_2$), the inclination angles c, $e_1$, $e_2$, and d satisfy the following relationship:

$$2 \times c < e_1 \leq e_2 < d/2 \qquad (3)$$

(If the linear prism formed closest to the center m in the light guide direction is the linear prism 32A, then $e_1 = e_2 = e$.)

The thickness of the light guide plate 12 is approximately constant over its entirety from the incident light surface 13 to the incident light surface 15, excluding very slight variations due to the unevenness formed on the underside surface 20 by the plurality of linear prisms 32. For example, in the example shown in FIG. 2, the virtual base surfaces 35 of the plurality of linear prisms 32 all lie on one plane that is parallel to the emitting surface 19, and the distance between the emitting surface 19 and the virtual base surfaces 35 (in the example shown in FIG. 2, this distance corresponds to the thickness of the light guide plate 12 at the incident light surfaces 13 and 15) is typically about 0.2 to 5.0 mm (preferably 0.4 to 3.0 mm), whereas the highest height value of the linear prisms 32 from the virtual base surfaces 35 is typically about 0.1 to 10.0 μm (preferably 0.5 to 5.0 μm). In this respect, the light guide plate 12 forms a plate shape having a pair of principal surfaces (the emitting surface 19 and the underside surface 20) that oppose each other in parallel.

The spread illuminating apparatus 10 repeatedly and alternately illuminates the light source 17 disposed along the incident light surface 13 and the light source 18 disposed along the incident light surface 15 in the light guide plate 12, and thereby it is suitably used as a backlight of a liquid crystal panel in a naked eye 3D display system. Next, the operational effects of the spread illuminating apparatus 10 will be explained referring to FIGS. 4 and 5.

FIG. 4 is a graph illustrating the brightness distribution in the light guide direction for samples S1 to S4 of a spread illuminating apparatus. The sample S1 and the sample S2 correspond to the spread illuminating apparatus 10 shown in FIG. 1, and include the light guide plate 12 shown in detail in FIG. 2. The samples S3 and S4 are comparative examples. However, in the samples S3 and S4, the structure of the optical path conversion unit provided on the underside surface of the light guide plate differs only with respect to the points explained below, and thus in the following explanations of the samples S3 and S4, those components which are the same as or correspond to those of the samples S1 and S2 will be assigned the same reference numerals.

The size of the light guide 12 used in the samples S1 to S4 is 8.4 inches, the entire length in the light guide direction is 196 mm, and the effective emitting region is within the range of −87 mm to 87 mm. In all of the samples S1 to S4, the optical path conversion unit 31 constituted by the plurality of linear prisms 32 as shown in FIG. 2 is provided on the underside surface 20 of the light guide 12.

In the plurality of prisms 32 of the samples S1 to S4, the apex angle a and the inclination angles c and d of the first and second inclined surfaces 33 and 34 in the linear prisms 32B and 32C formed closest to the incident light surfaces 13 and 15, and the apex angle b and the inclination angles e of the pair of first inclined surfaces 33a and 33b in the linear prism 32A formed on the center m in the light guide direction are as shown in the following table.

TABLE 1

| Samples | Apex angle a [°] | Apex angle b [°] | Inclination angle c [°] | Inclination angle d [°] | Inclination angle e [°] |
|---------|------------------|------------------|-------------------------|-------------------------|-------------------------|
| S 1 | 168.198 | 175.638 | 0.396 | 11.406 | 2.181 |
| S 2 | 168.220 | 173.227 | 0.779 | 11.001 | 3.386 |
| S 3 | 168.000 | 168.002 | 0.600 | 11.400 | 5.999 |
| S 4 | 165.797 | 175.691 | 1.197 | 13.006 | 2.154 |

The optical path conversion unit 31 of the light guide plate 12 in the samples S1 and S2 satisfies all of the conditions explained above referring to FIG. 2, including the condition regarding the angles defining the cross-section shape of the linear prisms 32 shown in the above table.

In contrast, the optical path conversion unit 31 of the light guide plate in the sample S3 differs from the optical path conversion unit 31 according to the present invention with respect to the following points: as shown in the above table, the apex angle b of the linear prism 32A and the apex angle a of the linear prisms 32B and 32C are substantially identical, and thus the apex angles of the plurality of linear prisms 32 are not constituted such that they increase the closer the linear prism 32 is formed to the center m in the light guide direction, and the inclination angle e of the linear prism 32A and the inclination angle d of the second inclined surface 34 of the linear prisms 32B and 32C do not satisfy the relationship of "e<d/2".

The optical path conversion unit 31 of the light guide plate in the sample S4 differs from the optical path conversion unit 31 according to the present invention with respect to the following point: as shown in the above table, the inclination angle e of the linear prism 32A and the inclination angle c of the first inclined surface 33 of the linear prisms 32B and 32C do not satisfy the relationship of "2×c<e".

Both of the samples S3 and S4 are identical to the samples S1 and S2 corresponding to embodiments of the present invention with respect to all structures other than those in the points of difference explained above regarding the cross-section shape of the linear prisms 32.

Figure 4A:
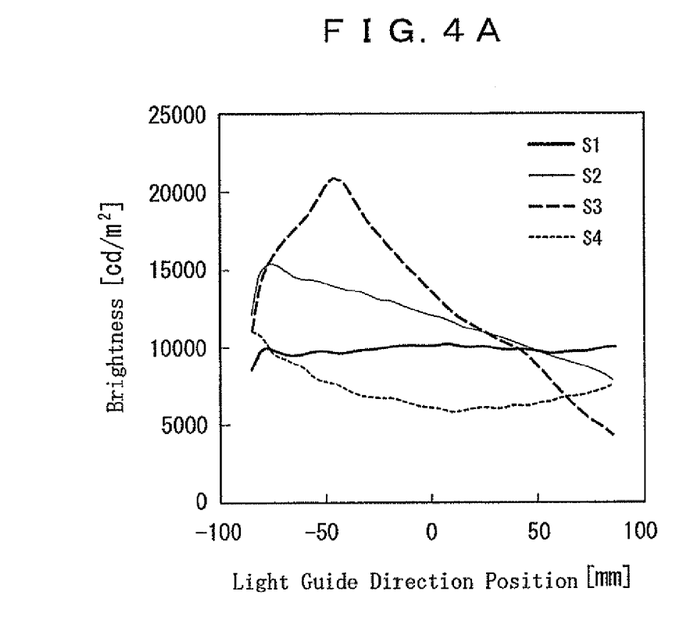
FIG. 4A shows the brightness distribution when only a light source at one incident light surface side is illuminated.
Figure 4B:
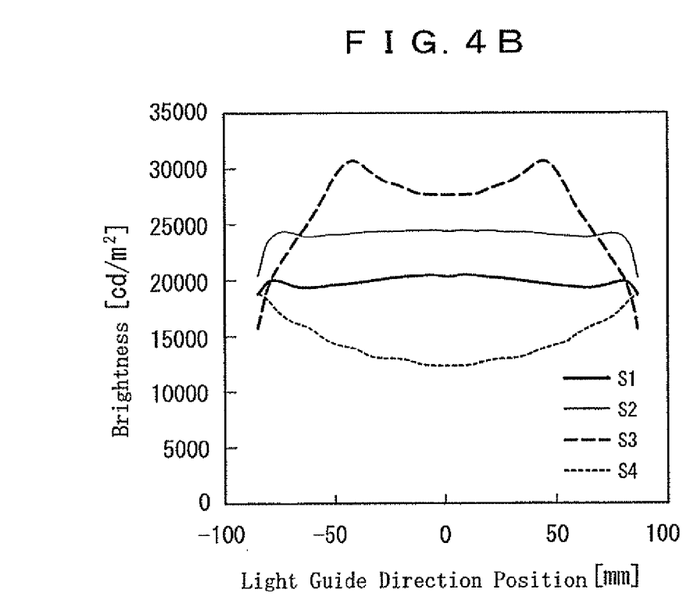
FIG. 4B shows the brightness distribution when light sources at both incident light surface sides are illuminated.

For the samples S1 to S4 constituted as described above, FIG. 4A illustrates the brightness distribution in the light guide direction when only a light source (for example, the light source 18) disposed on one of the incident light surfaces (for example, the incident light surface 15) is illuminated (below, also referred to as "during one-sided light source illumination"), and FIG. 4B illustrates the brightness distribution in the light guide direction when both of the light sources 17 and 18 disposed on both of the incident light surfaces 13 and 15 are illuminated (below, also referred to as "during two-sided light source illumination"). In FIGS. 4A and 4B, a light guide direction position, which is on the horizontal axis, of 0 mm corresponds to the center m in the light guide direction of the light guide plate 12. The negative direction on the horizontal axis is, for example, the direction from the center m toward the incident light surface 15, and in this case, the positive direction is the direction from the center m toward the incident light surface 13.

From FIGS. 4A and 4B, it can be understood that the sample S1, which is one embodiment of the present invention, exhibits good uniformity of brightness in the light guide direction during one-sided light source illumination and during two-sided light source illumination. As an index value for evaluating the brightness uniformity, if "minimum brightness value within the effective emitting region/maximum brightness value within the effective emitting region" is used, the index value of the brightness uniformity of the sample S1 is 85% during one-sided light source illumination and 92% during two-sided light source illumination.

Meanwhile, from FIG. 4A, it can be understood that in the sample S2, which is one embodiment of the present invention, the brightness decreases nearly uniformly from the incident light surface 15 side at which the light source 18 is disposed toward the other incident light surface 13 side in the effective emitting region during one-sided light source illumination. In this case, the index value of the brightness uniformity of the sample S2 is 52%, and considering only this result, the brightness uniformity is not particularly good.

However, in general, when the spread illuminating apparatus 10 is used as a backlight for a liquid crystal panel of a naked eye 3D display system, the switching when repeatedly and alternately illuminating the light sources 17 and 18 is carried out at sufficiently high speed. Therefore, in the case that the brightness distribution in the light guide direction during one-sided light source illumination exhibits characteristics in which the brightness decreases nearly uniformly from the incident light surface 15 side at which the light source 18 is disposed toward the other incident light surface 13 side, it is known that as long as the brightness uniformity is good (for example, an index value of 70% or greater) during two-sided light source illumination, a brightness distribution during one-sided light source illumination that exhibits a uniformity with an index value on the level of 50% or greater is sufficient and will cause no practical problems. The sample S2 exhibits good brightness uniformity during two-sided light source illumination, with an index value of 83%, and thus the sample S2 has a brightness uniformity that is sufficiently good with respect to practical use.

Next, in the sample S3, which is a comparative example, the brightness distribution during one-sided light source illumination reaches maximal values within the effective emitting region as shown in FIG. 4A. As shown in FIG. 4B, the brightness distribution during two-sided light source illumination of the sample S3 exhibits non-uniformity that directly reflects the brightness distribution during one-sided light source illumination. The index value of the brightness uniformity of the sample S3 is 21% during one-sided light source illumination and 51% during two-sided light source illumination. These results indicate that the sample S3 does not exhibit uniformity at a practicable level regarding the brightness distribution in the light guide direction.

In the sample S4, which is another comparative example, the brightness distribution during one-sided light source illumination reaches minimal values within the effective emitting region as shown in FIG. 4A. As shown in FIG. 4B, the brightness distribution during two-sided light source illumination of the sample S4 exhibits non-uniformity that directly reflects the brightness distribution during one-sided light source illumination. The index value of the brightness uniformity of the sample S4 is 53% during one-sided light source illumination and 66% during two-sided light source illumination. Similar to the sample S3, these results indicate that the sample S4 does not exhibit uniformity at a practicable level regarding the brightness distribution in the light guide direction.

The above-described evaluation of the brightness uniformity in the light guide direction for the samples S1 to S4 is summarized in the table below.

TABLE 2

| Samples | Brightness uniformity during one-sided light source illumination [%] | Brightness uniformity during two-sided light source illumination [%] | Evaluation |
| --- | --- | --- | --- |
| S1 | 85 | 92 | ○ |
| S2 | 52 | 83 | ○ |
| S3 | 21 | 51 | X |
| S4 | 53 | 66 | X |

Next, referring to FIG. 5, the brightness uniformity in the light guide direction will be explained for samples S5 to S8 of the spread illuminating apparatus. The size of the light guide 12 used in the samples S5 to S8 is 4.3 inches, the entire length in the light guide direction is 108.1 mm, and the effective emitting region is within the range of −48 mm to 48 mm.

The samples S5 and S6 correspond to the spread illuminating apparatus 10 shown in FIG. 1, and the samples S7 and S8 are comparative examples. However, in the following explanations of the samples S7 and S8, those components which are the same as or correspond to those of the samples S5 and S6 will be assigned the same reference numerals, and thus the samples S7 and S8 are similar to the samples S3 and S4 explained above.

Similar to the samples S1 to S4, the optical path conversion unit 31 constituted by the plurality of linear prisms 32 as shown in FIG. 2 is provided on the underside surface 20 of the light guide plate 12 in the samples S5 to S8. In the plurality of prisms 32 of the samples S5 to S8, the apex angle a and the inclination angles c and d of the first and second inclined surfaces 33 and 34 in the linear prisms 32B and 32C formed closest to the incident light surfaces 13 and 15, and the apex angle b and the inclination angles e of the pair of first inclined surfaces 33$a$ and 33$b$ in the linear prism 32A formed on the center m in the light guide direction are as shown in the following table.

TABLE 3

| Samples | Apex angle a [°] | Apex angle b [°] | Inclination angle c [°] | Inclination angle d [°] | Inclination angle e [°] |
|---|---|---|---|---|---|
| S 5 | 168.182 | 173.284 | 0.809 | 11.010 | 3.358 |
| S 6 | 163.966 | 172.100 | 1.216 | 14.819 | 3.950 |
| S 7 | 170.000 | 170.000 | 1.000 | 9.000 | 5.000 |
| S 8 | 171.785 | 175.573 | 1.207 | 7.008 | 2.213 |

The optical path conversion unit 31 of the light guide plate 12 in the samples S5 and S6 satisfies all of the conditions explained above referring to FIG. 2, including the condition regarding the angles defining the cross-section shape of the linear prisms 32 shown in the above table.

In contrast, similar to the sample S3 explained above, the optical path conversion unit 31 of the light guide plate in the sample S7 differs from the optical path conversion unit 31 according to the present invention with respect to the following points: the apex angle b of the linear prism 32A and the apex angle a of the linear prisms 32B and 32C are identical, and thus the apex angles of the plurality of linear prisms 32 are not constituted such that they increase the closer the linear prism 32 is formed to the center m in the light guide direction, and the inclination angle e of the linear prism 32A and the inclination angle d of the second inclined surface 34 of the linear prisms 32B and 32C do not satisfy the relationship of "e<d/2".

Similar to the sample S4 explained above, the optical path conversion unit 31 of the light guide plate in the sample S8 differs from the optical path conversion unit 31 according to the present invention with respect to the following point: the inclination angle e of the linear prism 32A and the inclination angle c of the first inclined surface 33 of the linear prisms 32B and 32C do not satisfy the relationship of "2×c<e".

Both of the samples S7 and S8 are identical to the samples S5 and S6 corresponding to embodiments of the present invention with respect to all structures other than those in the points of difference explained above regarding the cross-section shape of the linear prisms 32.

Figure 5A:
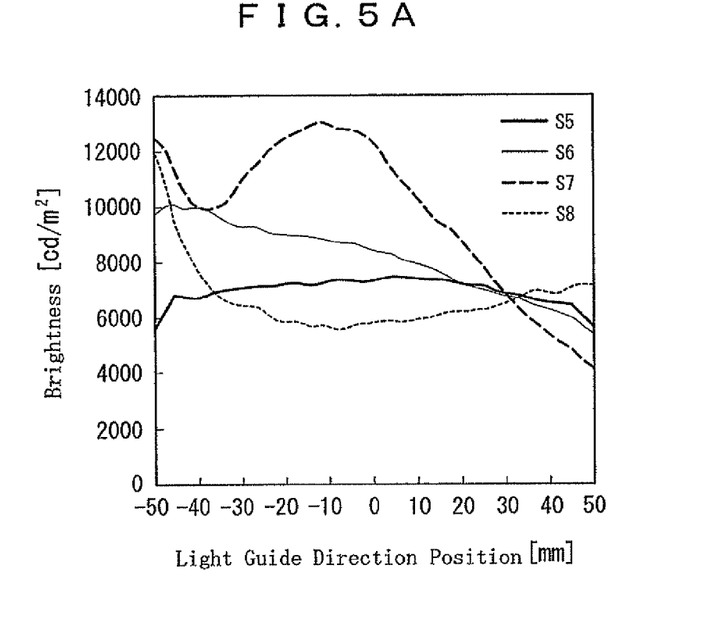
FIG. 5A shows the brightness distribution when only a light source at one incident light surface side is illuminated.
Figure 5B:
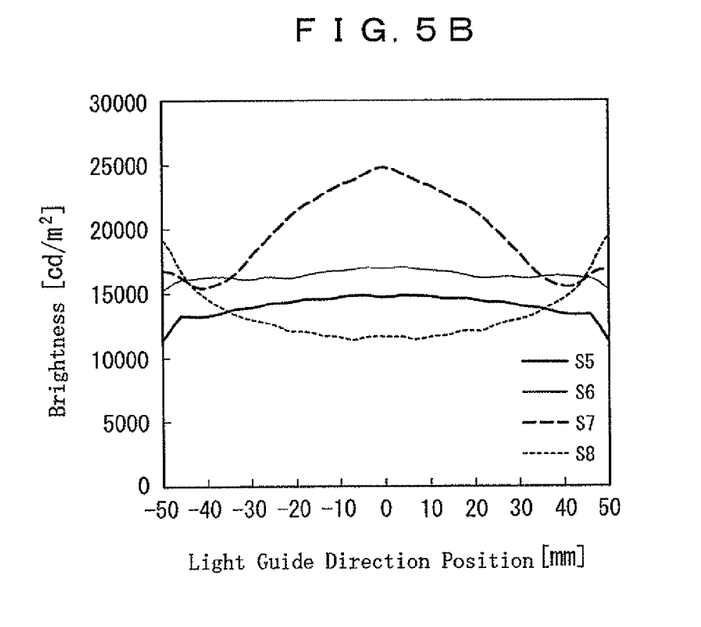
FIG. 5B shows the brightness distribution when light sources at both incident light surface sides are illuminated.

As can be understood from FIGS. 5A and 5B, the brightness distribution in the light guide direction of the samples S5 to S8 exhibits nearly identical characteristics to the samples S1 and S4 shown in FIGS. 4A to 4B with respect to the uniformity, and thus repetitive explanations thereof will be omitted, and only a summary of the evaluations of the brightness uniformity in the light guide direction is given in the table below.

TABLE 4

| Samples | Brightness uniformity during one-sided light source illumination [%] | Brightness uniformity during two-sided light source illumination [%] | Evaluation |
|---|---|---|---|
| S 5 | 76 | 77 | ○ |
| S 6 | 54 | 90 | ○ |
| S 7 | 32 | 62 | X |
| S 8 | 47 | 60 | X |

As shown in the above table, the samples S5 and S6 corresponding to embodiments of the present invention both exhibit good uniformity that is at least at a sufficiently practicable level with respect to the brightness distribution in the light guide direction, whereas the samples S7 and S8 corresponding to comparative examples do not exhibit good uniformity at a practicable level.

As described above, in the spread illuminating apparatus 10 in the present embodiment, by providing the optical path conversion unit 31 explained above referring to FIGS. 2 and 3 on the underside surface 20 of the light guide plate 12, it is possible to achieve uniformity that is at least sufficiently practicable with respect to the brightness distribution in the light guide direction.

Therein, in the spread illuminating apparatus 10, since a plate-shaped light guide plate 12 that has a pair of principal surfaces (the emitting surface 19 and the underside surface 20) that oppose each other in parallel is used, compared to, for example, a case in which the light guide plate is formed in barrel shape as in the conventional light guide plate 225 shown in FIG. 8, the uniformity of the brightness in the light guide direction of the spread illuminating apparatus 10 can be improved without inhibiting thickness reduction of the light guide plate 12, and by extension the spread illuminating apparatus 10, and without increases in the production cost associated with curving the underside surface 20.

In a naked eye 3D display system, in general, a so-called "crosstalk" problem is known, wherein the right-eye image and the left-eye image are not completely separated because a portion of light from a light source illuminated during right-eye image display (for example, the light source 17) is supplied to the left eye, and a portion of the light from a light source illuminated during left-eye image display (for example, the light source 18) is supplied to the right eye. The present inventors have confirmed that crosstalk is reduced by the spread illuminating apparatus 10 according to the present embodiment.

In the spread illuminating apparatus 10, in order to reduce crosstalk, it is advantageous to constitute the optical sheet 16 disposed on the underside surface 20 side of the light guide plate 12 as a member (having a reflectance of; for example, 30% or less) that prevents reflection of light that has entered the optical sheet 16 (and by extension, prevents such reflected light from entering the light guide plate 12). Meanwhile, in order to improve the brightness of the spread illuminating apparatus 10, it is advantageous to constitute the optical sheet 16 as a reflective sheet (having a reflectance of, for example, 98% or greater).

Therein, in the spread illuminating apparatus 10, in the light guide plate 12 shown in FIG. 2, the optical path conversion unit 31 was provided across the entire underside surface 20. However, in the light guide plate of the spread illuminating apparatus 10 according to the present embodiment, the optical path conversion unit 31 does not necessarily have to be provided across the entire underside surface 20. Next, referring to FIG. 6, an example of a structure of the light guide plate 12 in such a case will be explained.

Figure 6:
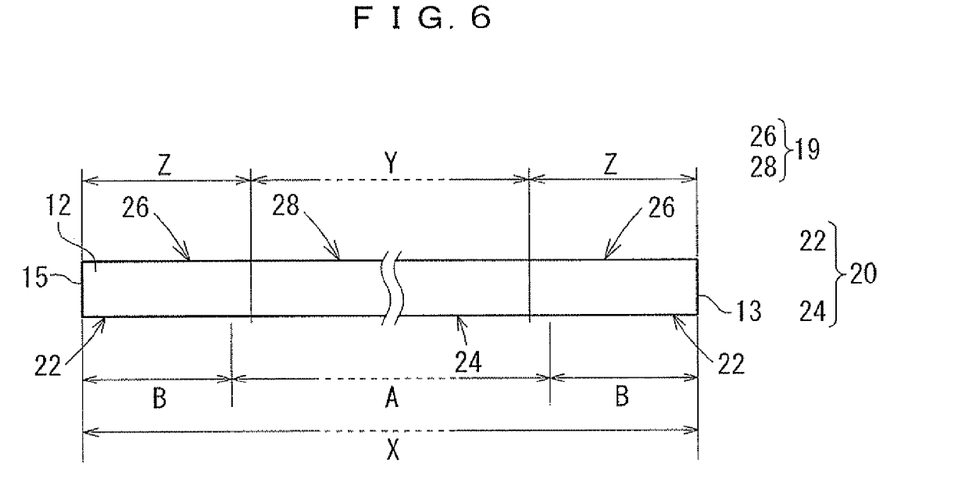
FIG. 6 is a side view illustrating another example of the light guide plate of the spread illuminating apparatus according to one embodiment of the present invention.

As explained above, the emitting surface 19 of the light guide plate 12 includes an effective emitting region 28 (with a length of Y) at the center in the light guide direction and non-effective emitting regions 26 (each having a length of Z) at the outsides of the effective emitting region 28 (the incident light surface 13 side and the incident light surface 15 side).

If the entire length of the light guide plate 12 is X, the length Z of the non-effective emitting regions 26 is "(X−Y)/2". The effective emitting region 28 is partitioned by the light blocking sheets 42 and 44 (refer to FIG. 1) disposed so as to cover the non-effective emitting regions 26 (in other words, the range of length Z from the incident light surfaces 13 and 15) of the emitting surface 19. The light blocking sheets 42 and 44 preferably are arranged to cover not only the non-effective emitting regions 26 of the emitting surface 19 of the light guide plate 12, but also the light sources 17 and 18.

The underside surface 20 of the light guide plate 12 can also be divided into a center region 24 (having a length of A) at the center in the light guide direction, and side regions 22

(each having a length of B) at the outsides of the center region 24 (the incident light surface 13 side and the incident light surface 15 side). The optical path conversion unit 31 as shown in FIG. 2 (and FIG. 3) can be provided on the center region 24, and a portion or all of the side regions 22 can be constituted as flat surfaces in which the optical path conversion unit 31 is not provided.

Therein, the side regions 22 are preferably constituted so that the length B is shorter than the length Z of the non-effective emitting regions 26. In other words, on the underside surface 20 of the light guide plate 12, the borders between the two side regions 22 and the center region 24 are within a region that corresponds to the non-effective emitting regions 26, and the sides regions 22 are provided outside of the effective emitting region 28.

In this way, in the spread illuminating apparatus 10, if a portion or all of the side regions 22 are constituted as flat surfaces, light emitted from the vicinity of the incident light surfaces 13 and 15 among the light that enters the light guide plate 12 from the incident light surfaces 13 and 15 is reduced. Thus, the brightness in the vicinity of the incident light surfaces 13 and 15 of the emitting surface 19 is prevented from becoming remarkably high due to the above-mentioned emitted light, and thereby the brightness uniformity of the emitting surface 19 is further improved. Thereby, the length of the region capable of being used as the effective emitting region 28 in which the usable brightness is uniform can be extended and the average brightness in the region in which the brightness is uniform can be increased.

In the spread illuminating apparatus 10, the plurality of linear prisms 32 included in the optical path conversion unit 31 can also be formed so that one or both of the following conditions are established: the inclination angle of the first inclined surface 33 of the linear prism 32 increases the closer the linear prism 32 is formed to the center m in the light guide direction, and the inclination angle of the second inclined surface 34 of the linear prism 32 decreases the closer the linear prism 32 is formed to the center m in the light guide direction.

The present invention was explained above based on the preferred embodiments, but the present invention is not limited to the above-described embodiments. For example, in the embodiments described above, the light guide plate 12 was constituted in a plate-shape having approximately constant thickness. However, the light guide plate of the spread illuminating apparatus according to the present invention can have a flat emitting surface and a curved underside surface to form a barrel shape in which the center is thicker than the peripheral portions (at the side end surfaces at which the light sources are disposed), and the optical path conversion unit 31 described above is provided on the curved underside surface. In this case, although the structure is unfavorable with regard to reducing the thickness of the spread illuminating apparatus, the uniformity of the brightness in the light guide direction can be further improved.

What is claimed is:

1. A spread illuminating apparatus comprising:
a light guide plate that emits light which has entered from side end surfaces from an emitting surface, which is a principal surface;
light sources disposed along two side end surfaces of the light guide plate, the two side end surfaces facing to each other; and
a two-sided prism sheet disposed on the emitting surface side of the light guide plate,
the spread illuminating apparatus further comprising an optical path conversion unit including a plurality of linear prisms formed repeatedly in a light guide direction on a surface on the opposite side of the emitting surface of the light guide plate, the optical path conversion unit being formed to have a symmetrical shape relative to a center in the light guide direction,
wherein the plurality of linear prisms each have a triangular cross-section shape,
an apex angle of each of the plurality of linear prisms increases the closer the linear prism is formed to the center in the light guide direction,
when a pair of inclined surfaces of each of the plurality of linear prisms is constituted by a first inclined surface that faces one of the side end surfaces at which the light sources are disposed and a second inclined surface that faces the center in the light guide direction, an inclination angle of the second inclined surface is larger than an inclination angle of the first inclined surface, and
among the plurality of linear prisms, inclination angles $e_1$ and $e_2$ of a pair of inclined surfaces of a linear prism that is formed closest to the center in the light guide direction and an inclination angle c of the first inclined surface and an inclination angle d of the second inclined surface of a linear prism that is formed closest to the side end surfaces at which the light sources are disposed satisfy a relationship $2 \times c < e_1 \leq e_2 < d/2$.

2. The spread illuminating apparatus according to claim 1, wherein the light source disposed along one of the two side end surfaces of the light guide plate and the light source disposed along the other side end surface are repeatedly and alternately illuminated.

3. The spread illuminating apparatus according to claim 1, wherein the light guide plate has an approximately constant thickness from one of the two side end surfaces at which the light sources are disposed to the other side end surface.

4. The spread illuminating apparatus according to claim 2, wherein the light guide plate has an approximately constant thickness from one of the two side end surfaces at which the light sources are disposed to the other side end surface.

* * * * *